US007672561B1

(12) United States Patent
Keith et al.

(10) Patent No.: US 7,672,561 B1
(45) Date of Patent: Mar. 2, 2010

(54) TELECOMMUNICATIONS PATCHING SYSTEM WITH PATCHING MODULES

(75) Inventors: Scott Martin Keith, Plano, TX (US); Chin Choi-Feng, Carrollton, TX (US); Golam Mabud Choudhury, Warren, NJ (US); Theodore Alan Conorich, Lake Hiawatha, NJ (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 12/275,457

(22) Filed: Nov. 21, 2008

Related U.S. Application Data (63) Continuation-in-part of application No. 12/244,189, filed on Oct. 2, 2008, now abandoned.

(51) Int. Cl.
*G02B 6/00* (2006.01)
*G02B 6/36* (2006.01)
(52) U.S. Cl. ..................... 385/135; 385/134; 385/53; 385/59
(58) Field of Classification Search ................ 385/53, 385/55, 56, 58, 59, 70, 71, 77, 78, 88, 89, 385/92, 134, 135, 136, 137, 139; 398/50, 398/56, 139, 141
See application file for complete search history.

(56) References Cited

U.S. PATENT DOCUMENTS

| | | | |
|---|---|---|---|
| 5,339,379 A | 8/1994 | Kutsch et al. | 385/135 |
| 6,236,795 B1 | 5/2001 | Rodgers | 385/134 |
| 6,293,707 B1 | 9/2001 | Wild | 385/55 |
| 6,362,422 B1 | 3/2002 | Vavrik et al. | 174/50 |
| 6,418,262 B1 | 7/2002 | Puetz et al. | 385/134 |
| 6,424,781 B1 | 7/2002 | Puetz et al. | 385/135 |
| 6,535,682 B1 | 3/2003 | Puetz et al. | 385/135 |

(Continued)

OTHER PUBLICATIONS

ADC Telecommunications, Inc. Brochure: "Room to Grow", one page, Website: www.adc.com/truenet, (2007).

*Primary Examiner*—Brian M Healy
(74) *Attorney, Agent, or Firm*—Myers Bigel Sibley & Sajovec (57) ABSTRACT

A telecommunications patching system includes: a rear panel, the rear panel including a plurality of cutout areas; a series of central compartments mounted to the rear panel, the central compartments being disposed in adjacent, vertically stacked relationship in at least one column, the rear ends of the central compartments being aligned with at least one of the cutout areas; and at least one series of lateral compartments mounted to the rear panel, the lateral compartments being disposed in spaced apart, vertically stacked relationship and laterally positioned from the central compartments, the rear ends of the lateral compartments being aligned with at least one of the cutout areas. The system also includes at least one central patching module with a plurality of connectors, the central patching module residing in one of the central compartments, the plurality of connectors being oriented to receive a communications cable from a lateral direction, a rear end of the central patching module extending rearwardly through a respective one of the cutout areas; and at least one lateral patching module with a plurality of connectors, the lateral patching module residing in one of the lateral compartments, the plurality of connectors being oriented to receive a communication cable from a lateral direction, a rear end of the lateral patching module extending rearwardly through a respective one of the cutout areas.

27 Claims, 6 Drawing Sheets

U.S. PATENT DOCUMENTS

| | | |
|---|---|---|
| 6,556,763 B1 | 4/2003 | Puetz et al. .................. 385/135 |
| 6,614,978 B1 | 9/2003 | Caveney ..................... 385/135 |
| 6,845,207 B2 | 1/2005 | Schray ....................... 385/135 |
| 7,123,808 B2 * | 10/2006 | Denovich et al. ........... 385/135 |
| 2002/0129959 A1 | 9/2002 | Petersen .................... 174/68.1 |
| 2002/0141720 A1 * | 10/2002 | Halgren et al. .............. 385/134 |
| 2002/0150372 A1 | 10/2002 | Schray ....................... 385/135 |
| 2008/0002937 A1 | 1/2008 | Spisany et al. .............. 385/135 |

* cited by examiner

TELECOMMUNICATIONS PATCHING SYSTEM WITH PATCHING MODULES

RELATED APPLICATIONS

This is a continuation-in-part application of and claims the benefit of priority from U.S. patent application Ser. No. 12/244,189 filed Oct. 2, 2008 now abandoned, the disclosure of which is incorporated herein by reference in its entirety.

FIELD OF THE INVENTION

The present invention relates generally to telecommunications equipment, and more particularly to high-density fiber distribution apparatus.

BACKGROUND OF THE INVENTION

In the telecommunications industry, the use of fiber optic cables for carrying transmission signals is rapidly growing. To interconnect fiber optic equipment, fiber distribution frames and racks have been developed. Such frames and racks are typically located in a communications closet, data room, or the like, where technicians can easily connect and reconnect, or "patch," equipment in an organized and efficient manner. Examples of fiber distribution frames and racks are shown in U.S. Pat. Nos. 5,497,444 and 5,758,003, which are hereby incorporated by reference.

With the increase in use of fiber optic cables in the telecommunications industry, it is desirable to provide fiber distribution frames/racks with increased density.

"Density" refers to the number of locations, or ports, per unit volume or unit area for providing connections within the rack; thus, increased density can provide more connection/patching sites per rack. Many racks are configured to include multiple shelves or trays of a specific size (a standard height of 1.75 inches is known in the industry as a "Rack Unit", "RU", or just "U"); the size of a rack may be described in terms of "U" (e.g., a "6U" rack), and the shelves and trays may be described by the number of connections per "U" (e.g., 36 connections/U).

The space constraints associated with high-density distribution frames can cause cable and cord management problems. Effective cable/cord management can prevent excessive bending of fiber optic cables/cords within the frames. Effective cable/cord management may also reduce tangling of cables and cords, and may provide improved accessibility to components that may require servicing. Easily-understood labeling can also improve operator efficiency and accuracy. However, increased density can hamper desirable cable management practices.

SUMMARY OF THE INVENTION

As a first aspect, embodiments of the present invention are directed to a telecommunications patching module mounting bay. The mounting bay comprises: a rear panel, the rear panel including a plurality of cutout areas; a series of central compartments mounted to the rear panel, the central compartments being disposed in adjacent, vertically stacked relationship in at least one column, the rear ends of the central compartments being aligned with the cutout areas; and at least one series of lateral compartments mounted to the rear panel, the lateral compartments being disposed in spaced apart, vertically stacked relationship and laterally positioned from the central compartments, the rear ends of the lateral compartments being aligned with the cutout areas. Such a mounting bay may be well-suited for use with patching modules that slide into the compartments and receive patch cords from a lateral direction.

As a second aspect, embodiments of the present invention are directed to a telecommunications patching system, comprising: a rear panel, the rear panel including a plurality of cutout areas; a series of central compartments mounted to the rear panel, the central compartments being disposed in adjacent, vertically stacked relationship in at least one column, the rear ends of the central compartments being aligned with at least one of the cutout areas; and at least one series of lateral compartments mounted to the rear panel, the lateral compartments being disposed in spaced apart, vertically stacked relationship and laterally positioned from the central compartments, the rear ends of the lateral compartments being aligned with at least one of the cutout areas. The system also includes at least one central patching module with a plurality of connectors, the central patching module residing in one of the central compartments, the plurality of connectors being oriented to receive a communications cable from a lateral direction, a rear end of the central patching module extending rearwardly through a respective one of the cutout areas; and at least one lateral patching module with a plurality of connectors, the lateral patching module residing in one of the lateral compartments, the plurality of connectors being oriented to receive a communication cable from a lateral direction, a rear end of the lateral patching module extending rearwardly through a respective one of the cutout areas.

As a third aspect, embodiments of the present invention are directed to a telecommunications assembly, comprising: a mounting rack; and at least one telecommunications patching system. The patching system comprises: a rear panel, the rear panel including a plurality of cutout areas; a series of central compartments mounted to the rear panel, the central compartments being disposed in adjacent, vertically stacked relationship in at least one column, the rear ends of the central compartments being aligned with the cutout areas; and at least one series of lateral compartments mounted to the rear panel, the lateral compartments being disposed in spaced apart, vertically stacked relationship and laterally positioned from the central compartments, the rear ends of the lateral compartments being aligned with the cutout areas. The patching system further comprises at least one central patching module with a plurality of connectors, the central patching module residing in one of the central compartments, the central patching module having a plurality of connectors oriented to receive a communications cable from a lateral direction, a rear end of the central patching module extending rearwardly through the cutout area; and at least one lateral patching module with a plurality of connectors, the lateral patching module residing in one of the lateral compartments, the lateral patching module having a plurality of connectors oriented to receive a communication cable from a lateral direction, a rear end of the lateral patching module extending rearwardly through the cutout area.

As a fourth aspect, embodiments of the present invention are directed to a telecommunications patching system, comprising: a first vertical stack of patching modules, wherein each of the patching modules include a plurality of connectors on a first side thereof; and a second vertical stack of patching modules positioned laterally from the first side of the first vertical stack of patching modules, wherein the vertical distance between at least some adjacent patching modules of the second vertical stack of patching modules exceeds the vertical distance between adjacent patching modules of the second vertical stack of patching modules.

DETAILED DESCRIPTION OF EMBODIMENTS OF THE INVENTION

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly.

Also, as used herein the term "connector" is intended to encompass telecommunications connectors and devices employed to facilitate the interconnection of telecommunications cords and cables for the transmission of signals therebetween. A connector may include a termination device at the end of a cord or cable, an adapter that facilitates the interconnection of two termination devices (as may be employed in the interconnection of fiber optic cords and cables, such as may be found in a connector block), a jack, plug, or the like typically employed with copper cables and cords, or other devices that provide a location for the interconnection of cables and cords.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Figure 1:
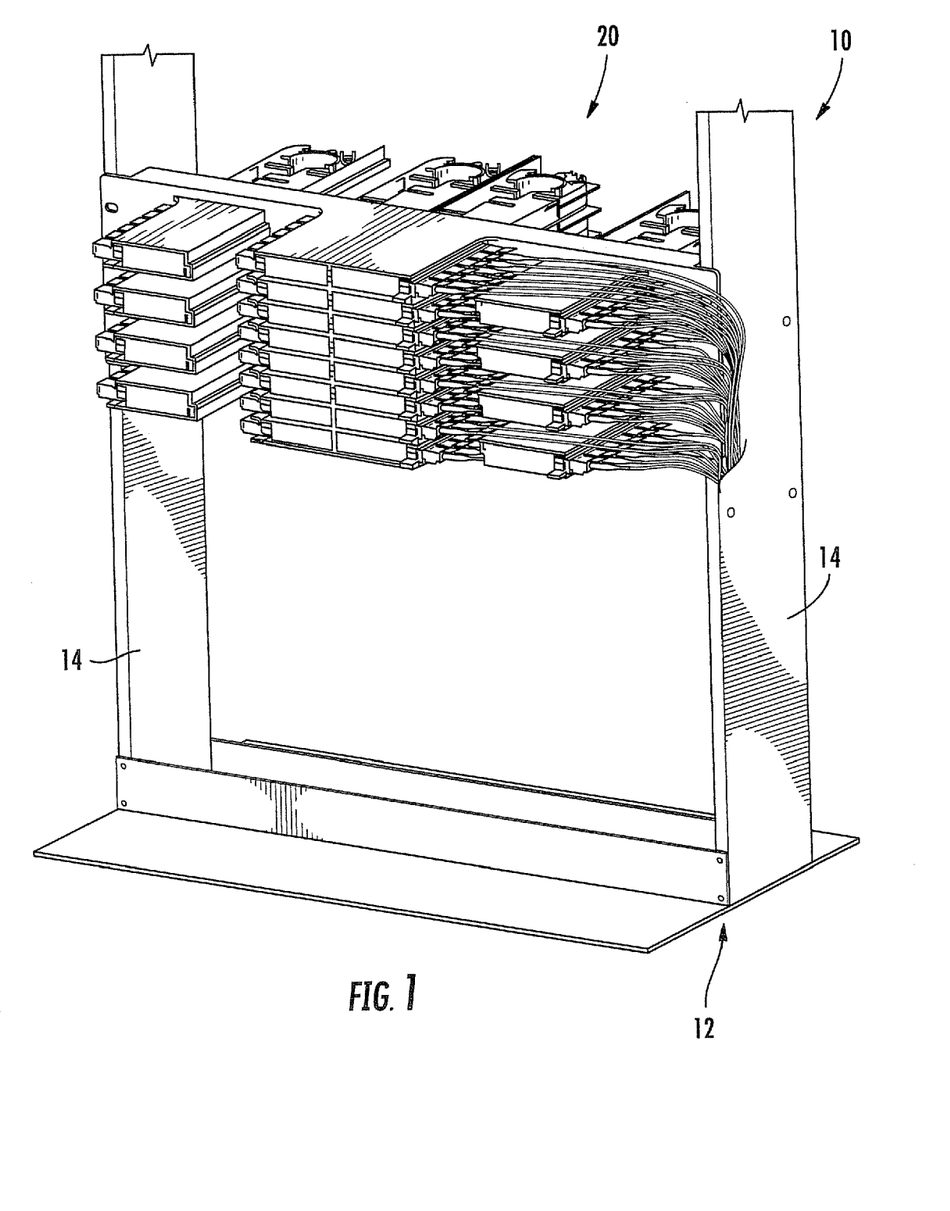
FIG. 1 is a perspective view of a communications rack with a telecommunications patching assembly according to embodiments of the present invention.

Turning now to the drawings, a communications rack, designated broadly at 10, is illustrated in FIG. 1. The rack 10 includes a frame 12 having two vertical, spaced apart uprights 14. Each of the uprights 14 includes mounting holes for the mounting of patching systems 20. Although only one patching system 20 is shown mounted therein, the rack 10 may (and typically will) include multiple termination module systems 20.

Figure 2:
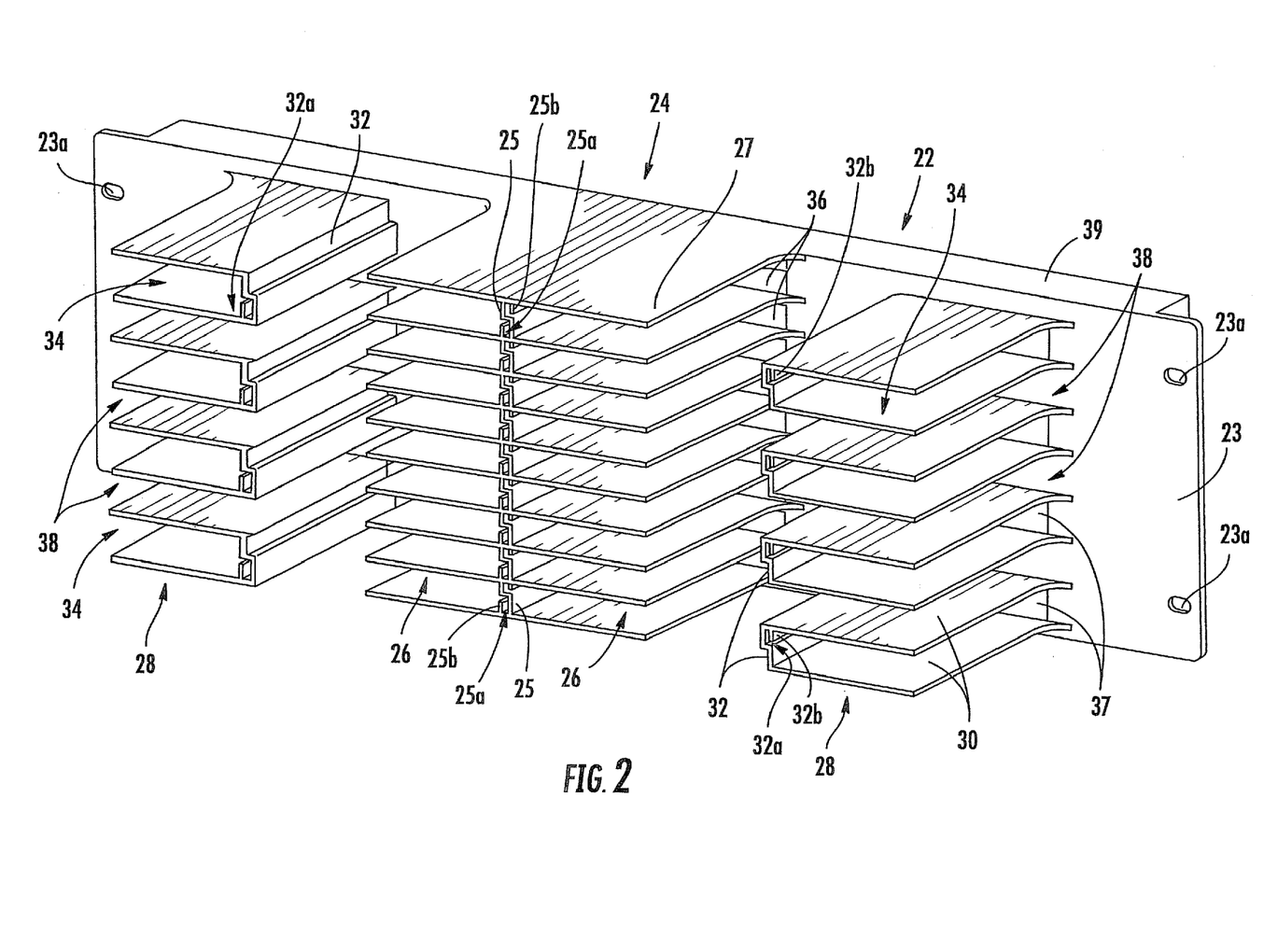
FIG. 2 is a perspective view of the module mounting bay of the telecommunications patching system of the assembly of FIG. 1.

Turning now to FIG. 2, the patching system 20 includes a module mounting bay 22. The mounting bay 22 has a rear wall 23 with lateral apertures 23a via which the patching system 20 can be mounted to the uprights 14. Spacing walls 39, which help to guide the mounting bay 22 during mounting on the uprights 22, extend rearwardly from the rear wall 23.

As used herein, the terms "front," "forward", and derivatives thereof refer to the direction defined by a vector originating at the rear wall 23 and extending perpendicular thereto and away from the spacing walls 39. The term "rear" and derivatives thereof refer to the direction opposite that of the forward direction, i.e., the direction defined by a vector originating at the rear wall 23 and extending perpendicular thereto and toward the spacing walls 39. The forward and rear directions comprise the "longitudinal" dimensions of the device. The term "lateral" and derivatives thereof refer to the direction originating at the center point of the rear wall 23 and extending parallel to the rear wall 23 and toward the uprights 14 of the frame 12. Thus, if one structure is described as being "lateral" of another structure, it is located farther from the center point of the rear wall 23 than the second structure. The terms "inner," "inboard" and derivatives thereof refer to the direction opposite the lateral direction. The lateral and inboard directions comprise the "transverse" dimensions of the device.

Referring still to FIG. 2, the mounting bay 22 also includes a central shelf unit 24 and lateral shelf units 28. The central shelf unit 24 includes a plurality of partitions 27 that extend laterally from central guide walls 25, thereby forming a series of compartments 26. As can be seen in FIG. 2, the compartments 26 are disposed in adjacent, vertically stacked relationship. In this embodiment, the compartments 26 are arranged in two columns, although in other embodiments other numbers of columns may be employed. Each guide wall 25 is stepped, such that a recess 25a is formed on each side, with the recesses 25a in one side of the guide walls 25 (in FIG. 2, the left side) being on the lower portion of the compartment 26 and the recesses 25a on the other side of the guide walls 25 (in FIG. 2, the right side) being on the upper portion of the compartment 26. Also, a guide flange 25b extends into each recess 25a (upwardly for the left compartments 26, and downwardly for the right compartments 26). Cutouts 36 in the rear wall 23 align with the compartments 26; i.e., the cutouts 36 are located to enable objects residing in the compartments 26 to pass or extend through the rear wall 23.

Referring once again to FIG. 2, the mounting bay 22 also includes lateral shelf units 28 mounted on either side of the central shelf unit 24. Each of the lateral shelf units 28 includes a vertical wall 32 with recesses 32a and guide flanges 32b. Partitions 30 extend laterally from the vertical wall 32 to form compartments 34. The guide flanges 32b extend downwardly from an upper partition 30 into the recesses 32a in the right hand compartments 34 and upwardly from the lower partitions 30 in the left hand compartments 34. As with the compartments 26, cutouts 37 in the rear wall 23 align with the compartments 34. However, unlike the compartments 26 of the central shelf unit 23, the compartments 34 are separated from each other by gaps 38, such that the compartments 34 are in spaced apart, vertically stacked relationship. The compartments 34 are vertically offset from their adjacent compartments 26 of the central shelf unit 23 (i.e., the central "step" of the vertical wall 32 of a lateral compartment 34 is at the same elevation as a partition 27 of the central shelf unit 24).

Figure 4:
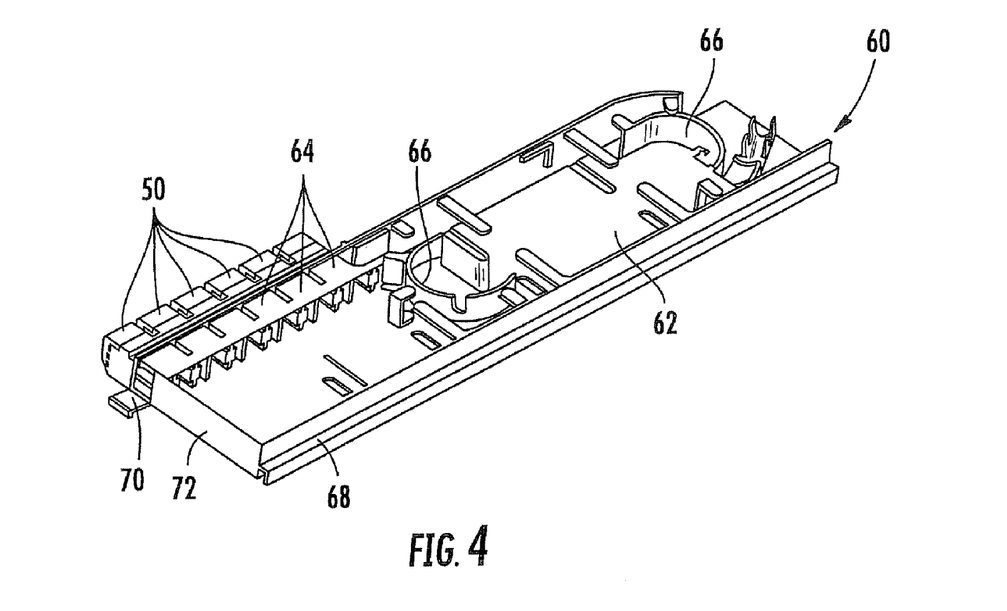
FIG. 4 is a perspective view of an exemplary termination module of the system of FIG. 1.

Turning now to FIG. 4, a patching module, designated broadly at 60, is illustrated therein. The patching module 60 is exemplary of and identical to multiple patching modules 60 of the system 10; as such, only one patching module 60 will be described therein, with the understanding that the description is equally applicable to the other patching modules 60.

The patching module 60 has an elongate floor 62 that includes, in the illustrated embodiment, two fiber guides 66 for guiding optical fiber as it is routed through the module 60 to prevent damage and preserve operability of the optical fiber (in this illustrative example, two semi-circular fiber guides 66 are shown, but any number and/or shape of fiber guide 66 may be used). Connector mounts 64 are positioned in a row along a lateral edge of the floor 62. The module 60 also includes a slide guide 68 having an L-shaped cross-section on the edge of the floor 62 opposite the connector mounts 64. At its front edge, the module 60 includes a tab 70 that extends from the front wall 72 of the module 60 for easy handling of the module 60.

Figure 3:
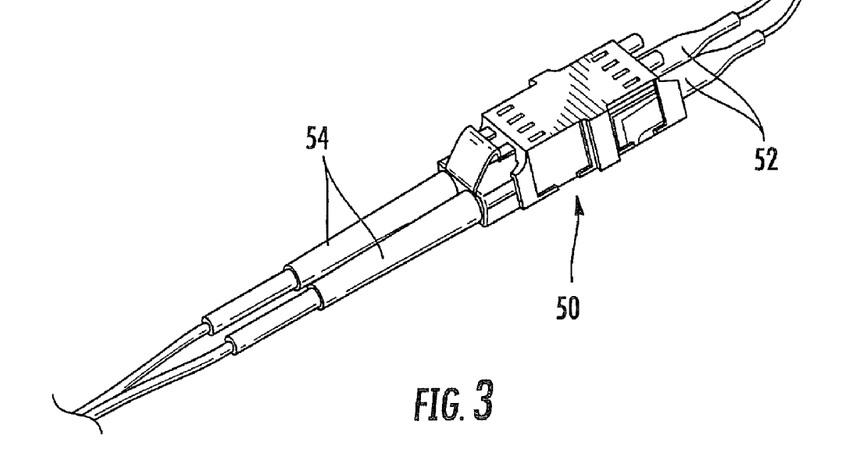
FIG. 3 is a perspective view of an exemplary connector, patch cord and cables of the patching system of FIG. 1.

Turning now to FIG. 3, an exemplary optical connector 50 is shown therein. Patch cords 52 are illustrated entering one end of the connector 50, and cables 54 are shown entering the opposite side of the connector 50. The connector 50 is mounted in one of the connector mounts 64 in the module 60 (see FIG. 4).

Figure 5:
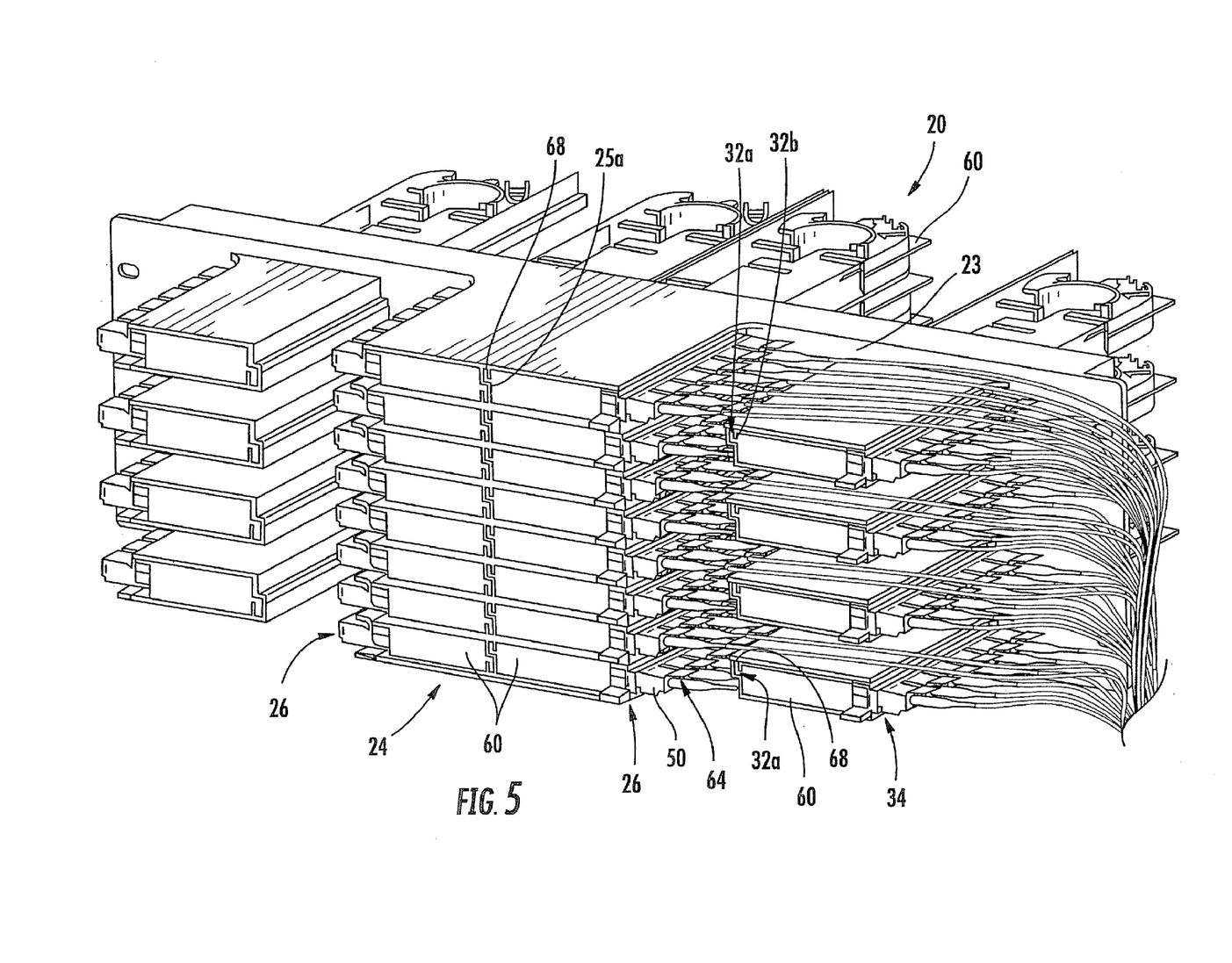
FIG. 5 is a perspective view of the telecommunications system of FIG. 1 with patching modules loaded into some of the compartments thereof.
Figure 6:
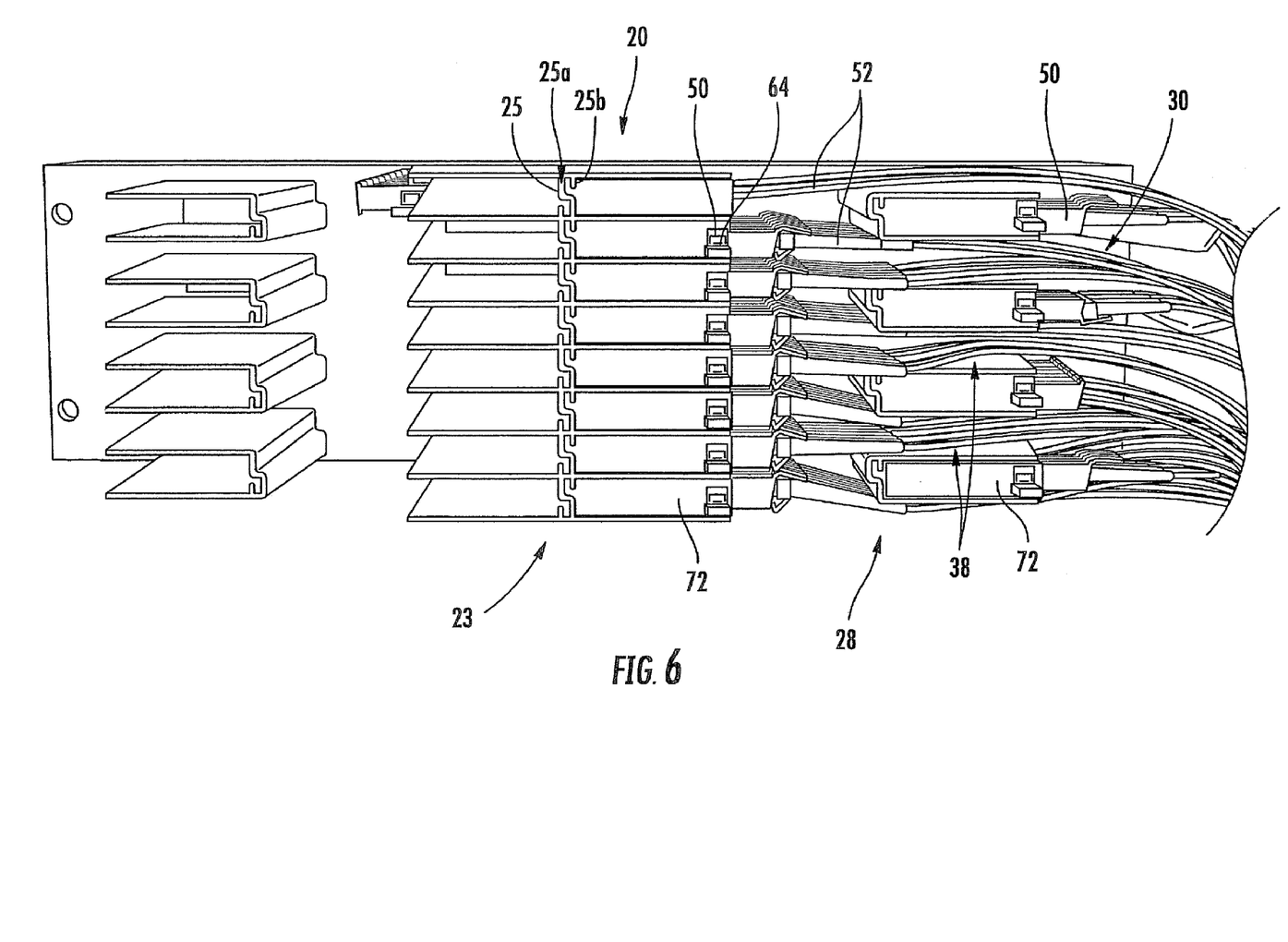
FIG. 6 is an enlarged front view of the system of FIG. 5.

Turning now to FIGS. 5 and 6, the assembled patching system 20 is shown therein. In FIG. 5, all of the central and lateral compartments 26, 34 are populated with patching modules 60 (although only those on the right half of the system 20 are connected to patch cords 52); in FIG. 6, only one side of the central shelf unit 24 and one lateral shelf unit 28 include patching modules 60 and patch cords 52. As can be seen in FIG. 5, each of the compartments 26 of the central shelf unit 24 houses a termination module 60. The rear end of each module 60 in the central shelf unit 24 passes through the cutout 36 of its respective compartment 26 and extends rearwardly therefrom behind the rear wall 23. The slide guide 68 of module 60 fits within the recess 25a of its respective compartment 26 and is captured by the flange 25b. As shown, the modules 60 on one side of the central divider 25 (in FIGS. 5 and 6, on the right side of the guide walls 25) are oriented so that the fiber guides 62 face downwardly (i.e., they are inverted from their orientation in FIG. 4). Modules 60 on the other side of the guide walls 25 (on the left side of the guide walls 25 in FIG. 5) would be oriented so that the fiber guides 62 face upwardly. With the modules 60 so oriented, the connector mounts 64 and connectors 50 face away from the guide walls 25 (i.e., they face laterally) and are laterally accessible for interconnection with patch cords 52.

Referring now to FIG. 5, each of the compartments 34 of the lateral shelf units 28 is filled with a module 60. In each instance, the module 60 extends through the cutout 37 in the rear wall 23 associated with its compartment 34, and its slide guide 68 fits within the recess 32a in the vertical wall 32 and is held in place by the flange 32b. Like the modules 60 that reside in the compartments 26 of the central shelf unit 24, the modules 60 that reside in the lateral shelf units 28 are oriented so that the connector mounts 64 and connectors 50 face laterally.

Referring again to FIGS. 5 and 6, it can be seen that patch cords 52 are connected to the connectors 50 mounted in the connector mounts 64. The patch cords 52 approach from the lateral direction for connection with the connectors 50 mounted in modules 60 located in the compartments 26, 34. As shown in FIG. 6, the patch cords 52 that attach to the modules 60 located in the compartments 26 of the central shelf unit 24 are largely routed through the gaps 38 between the compartments 34 of the lateral shelf unit 28 (the exceptions are the patch cords 52 that connect to the uppermost and lowermost modules 60 in the central shelf unit 23, which pass above the uppermost and below the lowermost compartments 34 of the lateral shelf unit 28).

The illustrated arrangement of modules 60 and patch cords 52 can enable the density of the system 20 to be increased. The illustrated module system 20, with sixteen modules 60 housed in the central shelf unit 23 (in two "stacks" of eight modules) and four modules 60 housed in each of the lateral shelf units 28, is typically about 4 U in height. With this arrangement, the density of connections can be as high as 48 ports/U or more.

It can also be recognized from FIG. 6 that the front wall 72 provides a suitable space for affixing a label. Such a label can provide information about the identity of the connections made with the connectors 50.

Figure 7:
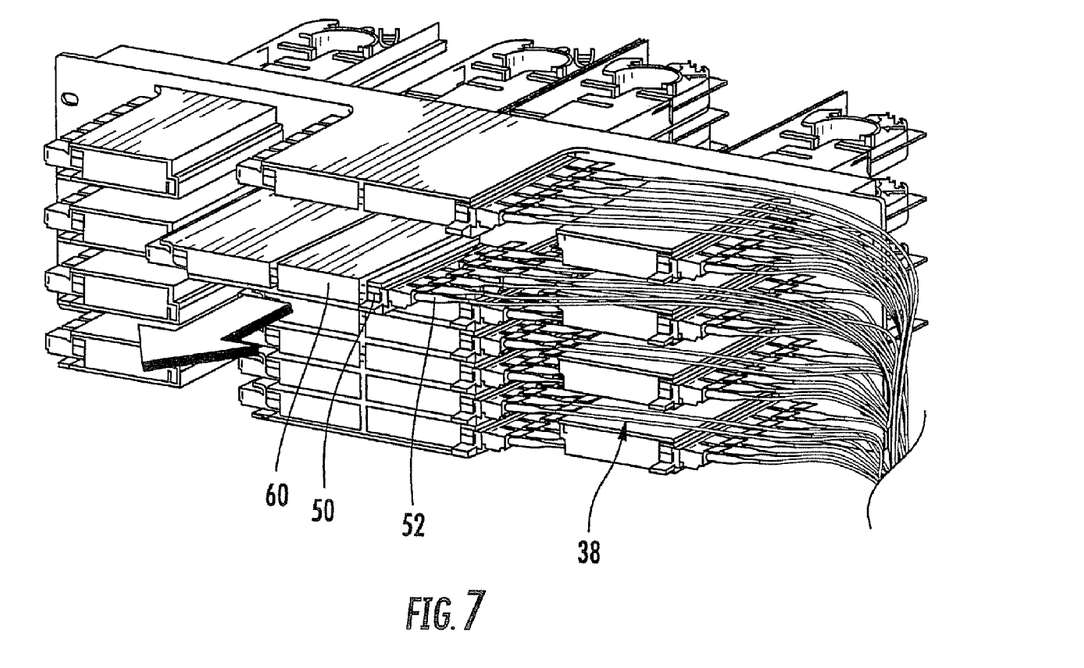
FIG. 7 is a side perspective view of the system of FIG. 5 with one of the modules in an access position.

FIG. 7 illustrates the access position that can be achieved with the modules 60. As is shown in FIG. 7, a module 60 can be slid forward within its compartment 26, 34 to enable a technician to connect or disconnect patch cords 52 or cables from the connectors 50 of the module 60. Sliding the modules 60 forward provides easy access to the connectors 50, cords 52 and cables 54. Because the patch cords 52 of the modules 60 are routed through the gaps 38 between the compartments 34 of the lateral shelf units 28, they can also slide forward with the module 60 without the need for disconnection.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunications patching module mounting bay, comprising:
   a rear panel, the rear panel including a plurality of cutout areas;

a series of central compartments mounted to the rear panel, the central compartments being disposed in adjacent, vertically stacked relationship in at least one column, the rear ends of the central compartments being aligned with the cutout areas; and two series of lateral compartments mounted to the rear panel, one series of lateral compartments on each side of the central compartments, the lateral compartments being disposed in spaced apart, vertically stacked relationship and laterally positioned from the central compartments, the rear ends of the lateral compartments being aligned with the cutout areas, gaps being present between adjacent lateral compartments.

2. The mounting bay defined in claim 1, wherein each of the central compartments includes a longitudinal recess.

3. The mounting bay defined in claim 1, wherein the central compartments are arranged in two columns, and wherein horizontally adjacent central compartments are divided by a central wall.

4. The mounting bay defined in claim 3, wherein each of the central compartments includes a longitudinal recess in the central wall.

5. The mounting bay defined in claim 4, wherein recesses of horizontally adjacent central compartments are in vertically stacked relationship.

6. A telecommunications patching system, comprising:
a rear panel, the rear panel including a plurality of cutout areas;
a series of central compartments mounted to the rear panel, the central compartments being disposed in adjacent, vertically stacked relationship in at least one column, the rear ends of the central compartments being aligned with at least one of the cutout areas; and
at least one series of lateral compartments mounted to the rear panel, the lateral compartments being disposed in spaced apart, vertically stacked relationship and laterally positioned from the central compartments, the rear ends of the lateral compartments being aligned with at least one of the cutout areas;
at least one central patching module with a plurality of connectors, the central patching module residing in one of the central compartments, the plurality of connectors being oriented to receive a communications cable from a lateral direction, a rear end of the central patching module extending rearwardly through a respective one of the cutout areas; and
at least one lateral patching module with a plurality of connectors, the lateral patching module residing in one of the lateral compartments, the plurality of connectors being oriented to receive a communication cable from a lateral direction, a rear end of the lateral patching module extending rearwardly through a respective one of the cutout areas;
wherein the central patching module is slidably mounted in its corresponding central compartment and is slidable to a forward access position, in which the plurality of connectors are positioned in front of the central compartments; and
wherein the lateral patching module is slidably mounted in its corresponding lateral compartment.

7. The system defined in claim 6, wherein each of the central compartments includes a longitudinal recess, and wherein each of the central patching modules includes a longitudinal guide that fits within a respective recess.

8. The system defined in claim 6, wherein the central patching module includes fiber guide features.

9. The system defined in claim 6, wherein the connectors of the central patching module are aligned in a longitudinal row.

10. The system defined in claim 6, wherein the connectors of the lateral patching module are aligned in a longitudinal row.

11. The system defined in claim 6, wherein each of the central patching modules includes a front surface suitable for labeling.

12. The system defined in claim 6, wherein the central compartments are arranged in two columns, and wherein horizontally adjacent central compartments are divided by a central wall.

13. The system defined in claim 12, wherein each of the central compartments includes a longitudinal recess in the central wall, and wherein each of the central patching modules includes a longitudinal guide that fits within the recess.

14. The system defined in claim 13, wherein recesses of horizontally adjacent central compartments are in vertically stacked relationship.

15. A telecommunications assembly, comprising:
a mounting rack; and
at least one telecommunications patching system, comprising:
a rear panel, the rear panel including a plurality of cutout areas;
a series of central compartments mounted to the rear panel, the central compartments being disposed in adjacent, vertically stacked relationship in at least one column, the rear ends of the central compartments being aligned with the cutout areas; and
at least one series of lateral compartments mounted to the rear panel, the lateral compartments being disposed in spaced apart, vertically stacked relationship and laterally positioned from the central compartments, the rear ends of the lateral compartments being aligned with the cutout areas;
at least one central patching module with a plurality of connectors, the central patching module residing in one of the central compartments, the central patching module having a plurality of connectors oriented to receive a communications cable from a lateral direction, a rear end of the central patching module extending rearwardly through the cutout area;
at least one lateral patching module with a plurality of connectors, the lateral patching module residing in one of the lateral compartments, the lateral patching module having a plurality of connectors oriented to receive a communication cable from a lateral direction, a rear end of the lateral patching module extending rearwardly through the cutout area; and
patch cords connected with the connectors of the central patching module, the patch cords being routed between two adjacent lateral compartments.

16. The assembly defined in claim 15, further comprising cables routed from the connectors through the cutout area corresponding to the central patching module.

17. The assembly defined in claim 15, wherein the central patching module is slidably mounted in its corresponding central compartment and is slidable to a forward access position, in which the plurality of connectors are positioned in front of the central compartments.

18. The assembly defined in claim 15, wherein the lateral patching module is slidably mounted in its corresponding lateral compartment.

19. The assembly defined in claim 15, wherein each of the central compartments includes a longitudinal recess, and wherein each of the central patching modules includes a longitudinal guide that fits within the recess.

20. The assembly defined in claim 15, wherein the central patching module includes fiber guide features.

21. The assembly defined in claim 15, wherein the connectors of the central patching module are aligned in a longitudinal row.

22. The assembly defined in claim 15, wherein the connectors of the lateral patching module are aligned in a longitudinal row.

23. The assembly defined in claim 15, wherein each of the central patching modules includes a front surface suitable for labeling.

24. The assembly defined in claim 15, wherein the central compartments are arranged in two columns, and wherein horizontally adjacent central compartments are divided by a central wall.

25. The assembly defined in claim 24, wherein each of the central compartments includes a longitudinal recess in the central wall, and wherein each of the central patching modules includes a longitudinal guide that fits within the recess.

26. The assembly defined in claim 25, wherein recesses of horizontally adjacent central compartments are in vertically stacked relationship.

27. A telecommunications patching system, comprising:
 a first vertical stack of patching modules, wherein each of the patching modules include a plurality of connectors on a first lateral side thereof; and
 a second vertical stack of patching modules positioned laterally from the first side of the first vertical stack of patching modules, wherein the vertical distance between at least some adjacent patching modules of the second vertical stack of patching modules exceeds the vertical distance between adjacent patching modules of the first vertical stack of patching modules.

\* \* \* \* \*